US006109130A

United States Patent [19]

Will

[11] Patent Number: 6,109,130

[45] Date of Patent: Aug. 29, 2000

[54] CONTROL LEVER

[75] Inventor: Harald Will, Aschaffenburg, Germany

[73] Assignee: Linde Aktiengesellschaft, Germany

[21] Appl. No.: 09/201,689

[22] Filed: Nov. 30, 1998

[30] Foreign Application Priority Data

Dec. 4, 1997 [DE] Germany ........................... 197 53 867

[51] Int. Cl.$^{7}$ .............................. G05G 1/04; G05G 1/00; B60Q 1/00

[52] U.S. Cl. ......................... 74/470; 74/491; 74/471 XY; 340/456; 340/665

[58] Field of Search ............................... 74/471 XY, 491, 74/523, 527, 531, 526; 345/161, 160, 157, 159; 340/665, 456

[56] References Cited

U.S. PATENT DOCUMENTS

| | | | |
|---|---|---|---|
| 5,160,918 | 11/1992 | Saposnik et al. | 74/471 XY X |
| 5,576,704 | 11/1996 | Baker et al. | 74/471 XY X |
| 5,680,796 | 10/1997 | Wustenberg et al. | 74/471 XY |
| 5,767,840 | 6/1998 | Selker | 74/471 XY X |
| 5,828,363 | 10/1998 | Yaniger et al. | 345/161 |
| 5,831,554 | 11/1998 | Hedayat et al. | 74/471 XY X |
| 5,831,596 | 11/1998 | Marshall et al. | 74/471 XY X |
| 5,850,142 | 12/1998 | Rountos et al. | 74/471 XY X |
| 5,875,682 | 3/1999 | Smith | 74/471 XY |
| 5,889,507 | 3/1999 | Engle et al. | 345/161 |

*Primary Examiner*—David A. Bucci
*Assistant Examiner*—Marcus Charles
*Attorney, Agent, or Firm*—Webb Ziesenheim Logsdon Orkin & Hanson, P.C.

[57] ABSTRACT

A control lever for a vehicle or a machine tool, in particular for an industrial truck, is disclosed for the generation of an electrical control signal. The actuation travel of the control lever is limited by a stop point that is defined by a stop and the control lever has means to generate a restoration force. The stop has an elastic component, as a result of which an at least slight deflection of the control lever beyond the stop point is possible. The elastic component of the stop is realized so that in the event of a deflection beyond the stop point, the restoration force, as a function of the deflection, increases to a greater extent than in the event of a deflection of the control lever between a neutral position and the stop point. When a defined, safety-critical deflection of the control lever is reached, whereby the control lever during this safety-critical deflection is moved beyond the stop, a signal can be generated by an electrical sensor, as a result of which a safety function of the vehicle or of the machine tool is actuated.

20 Claims, 2 Drawing Sheets

CONTROL LEVER

BACKGROUND OF THE INVENTION

1. Field of the Invention

This invention relates generally to a control lever assembly for a vehicle or a machine tool, in particular for an industrial truck, to generate an electrical control signal, in which the actuation travel of the control lever is restricted by a stop point that is defined by a stop, and the control lever has means for the generation of a restoring force.

2. Description of the Currently Available Technology

Control levers, which are also frequently called "joysticks," are used to control certain functions of conventional vehicles or machine tools. On an industrial truck, for example, the various functions of a load holding device (e.g., elevation, lateral displacement, etc.) can frequently be controlled by such a control lever. However, on presently available control levers, the control lever cannot be moved beyond a predetermined stop point. When the control lever has reached the stop point, the control signal generated by the control lever cannot be further changed by increasing the actuation force on the control lever.

One limitation with presently available control levers is that in the event of a mechanical overload, e.g., of the type that would occur as a result of incorrect operation or the misuse of the control lever as a handhold, the control lever can be bent or broken off. Such an overload on the control lever can result in critical safety situations. For example, the control lever can generate control signals not intended by the driver or the damaged control lever can become stuck in a certain position.

Therefore, it is an object of the invention to provide a control lever in which damage to the control lever caused by an overload is reduced or eliminated and the risk of safety-critical situations is reduced.

SUMMARY OF THE INVENTION

The invention provides a control lever in which the stop has an elastic component, as a result of which a deflection, e.g., at a least slight deflection of the control lever beyond the stop point is possible. The stop point is selected so that the force required to reach the stop point can be reliably expected not to cause any damage to the control lever. The elasticity of the stop prevents a significant impact load on the control lever when it reaches the stop point. The mobility of the control lever beyond the stop point makes it possible to use the control lever to generate control signals that reflect a strong or excessive actuation force.

It is advantageous if the elastic component of the stop is realized so that in the event of a deflection of the control lever beyond the stop point, the restoring force, as a function of the deflection, increases to a greater extent than for a deflection of the control lever between a neutral position and the stop point. It is thereby guaranteed that when the driver actuates the control lever, he will be reliably aware of the stop point. Under normal conditions, the driver will then continue to move the control lever only a short distance beyond the stop point.

It is appropriate if there is a metal spring to generate the restoring force that acts in the event of a deflection between the neutral position and the stop point. Likewise, it is appropriate if there is an elastomeric component to produce the elasticity of the stop.

Conventionally, there is an electrical sensor that measures the deflection of the control lever. This sensor determines the direction of the deflection, by means of which the driver selects the function to be controlled and the angle of deflection, which generally determines the speed of the function being controlled. It is possible to measure these two variables with a single electrical sensor. For this purpose, it is possible to use an inductive sensor, for example, in which case a permanent magnet is fastened to the control lever.

It is particularly advantageous if, when a defined critical safety deflection of the control lever is reached in which the control lever is deflected beyond the stop during this safety-critical deflection, a signal can be generated by means of an electrical sensor, as a result of which a safety function of the vehicle or of the machine tool is actuated. The safety-critical deflection should correspond to the maximum allowable deflection angle of the control lever.

When this deflection angle is reached or exceeded, the above mentioned safety function is actuated. As the safety function, for example, the function selected by the direction of the deflection can be shut down. Likewise, it is possible that the safety function includes the complete shutdown of the vehicle or the machine tool, or the emission of a warning signal.

If a single electrical sensor is provided to detect the deflection of the control lever between a neutral position and the stop point and to detect the safety-critical deflection, the invention has the additional advantage that no additional signal transmitter is required for the safety function.

The safety-critical deflection is advantageously determined so that the force required to achieve the safety-critical deflection is at least twice as great, and preferably at least three times as great, as the force required to reach the stop point. Thus, with regard to the actuation force, there is a sufficient distance between the stop point and the safety-critical deflection to prevent accidental activation of the safety function.

The safety-critical deflection is also designed so that the force required to reach the safety-critical deflection has no adverse effect on the control lever as a result of the overload. The driver is therefore warned in good time by the automatic engagement of the safety function against further increasing the actuation force on the control lever.

In an advantageous embodiment of the invention, there is a device to detect the neutral position of the control lever. By means of such a device, a determination can be made at the time the vehicle or the machine tool is started up whether the control lever is in its neutral position. The startup is then permitted by a suitable control device only if the control lever is in the neutral position. In this manner, it can be ensured that a damaged control lever, such as a control lever that has become stuck at the stop point, will not engage any undesired function when the vehicle or the machine tool is started.

BRIEF DESCRIPTION OF THE DRAWINGS

Additional advantages and details of the invention are explained in greater detail below with reference to the exemplary embodiment illustrated in the accompanying figures, in which.

DESCRIPTION OF THE PREFERRED EMBODIMENT

Figure 1:
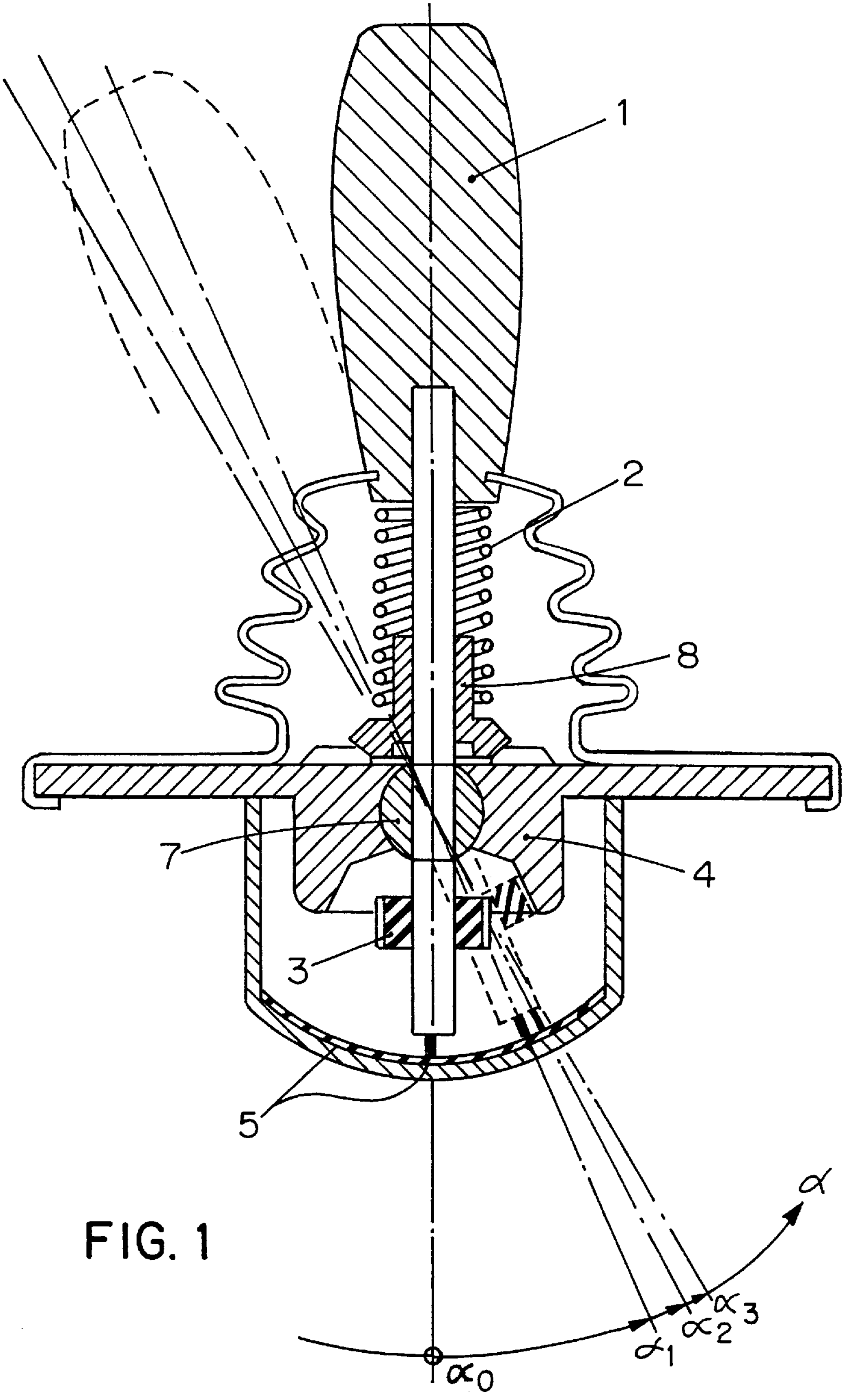
FIG. 1 is a sectional view of a control lever embodying features of the invention.

For purposes of the description hereinafter, the terms "above," "below," "right," "left," "vertical," "horizontal,"

and derivatives and equivalents thereof shall relate to the invention as it is oriented in the drawing figures. However, it is to be understood that the invention may assume various alternative variations and step sequences, except where expressly specified to the contrary. It also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

FIG. 1 shows a section through a control lever assembly of the invention and the major components that are important for the function of the control lever assembly. A control lever 1 is rotationally mounted, e.g., by a ball-and-socket joint 7, to a stationary housing plate 4. When the control lever 1 is deflected from a neutral position, designated $\alpha_0$ and shown in solid lines in FIG. 1, by an arbitrary distance, a spring 2 is compressed by a movable bushing 8 to generate a restoring force that acts in the direction of the indicated neutral position $\alpha_0$ of the control lever 1. Located on the lower end of the control lever 1 is a sensor 5, by means of which the deflection angle $\alpha$ from the neutral position $\alpha_0$ and the direction of the deflection are detected and converted into a corresponding control signal in conventional manner.

Also located on the lower end of the control lever 1 is a stop, preferably an elastomeric stop 3, which is configured to come into contact with the housing plate 4 in the event of a defined deflection $\alpha_1$ of the control lever 1 as shown in dashed lines in FIG. 1. This defined deflection $\alpha_1$ is also designated the stop point $\alpha_1$. By increasing the actuation force exerted on the control lever 1, the elastomeric stop 3 is compressed allowing the control lever 1 to be deflected, at least slightly, beyond the stop point $\alpha_1$.

In the region between deflections $\alpha_2$ and $\alpha_3$ shown in FIG. 1, for example, a safety-critical deflection may be defined and a safety function activated when this safety-critical deflection is reached. One possible safety function, for example, is the deactivation of the functions that can be controlled with the control lever 1.

Figure 2:
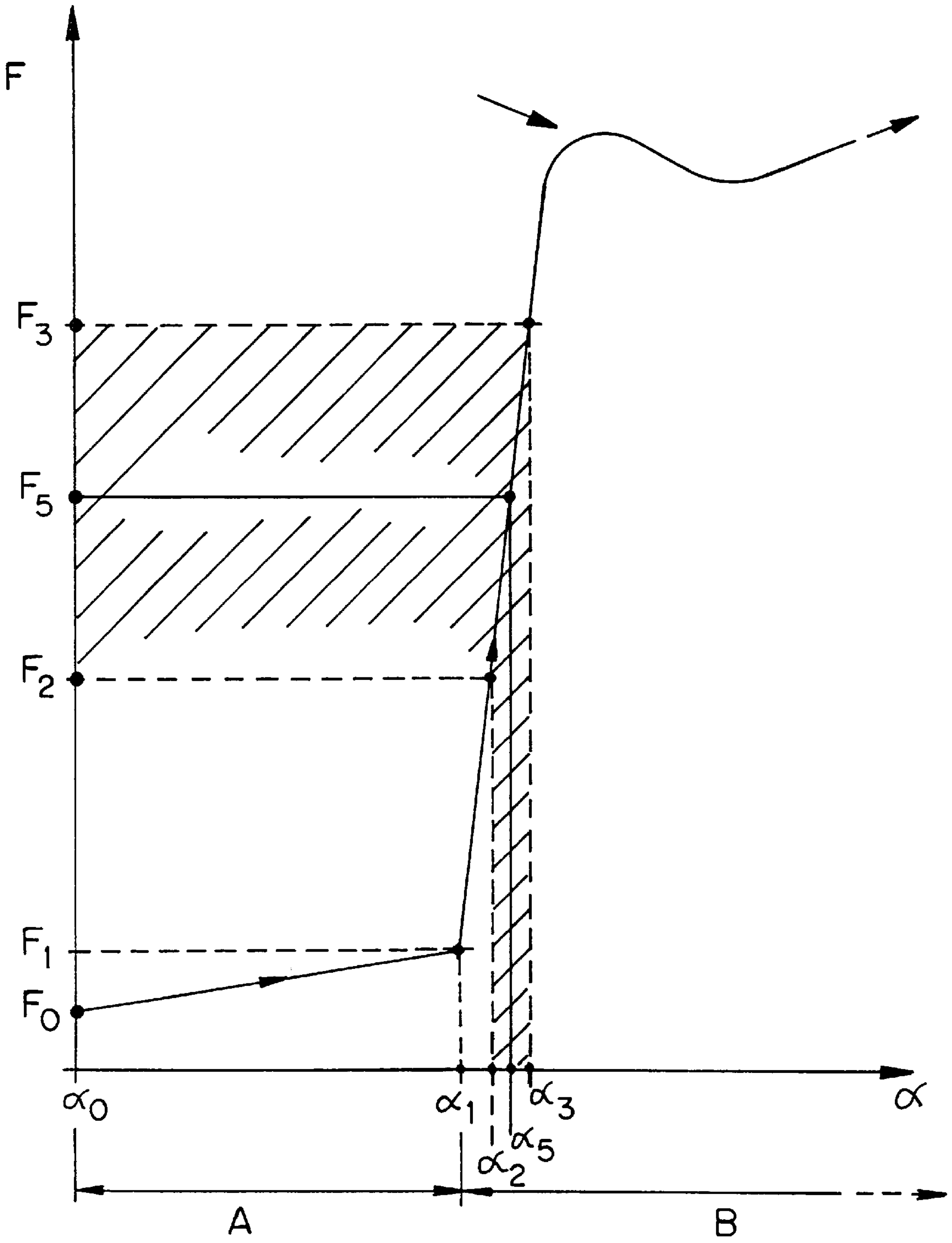
FIG. 2 qualitatively shows a curve of the actuation force versus the deflection angle for a control lever of the invention.

FIG. 2 qualitatively shows a curve of the actuation force F versus the deflection angle $\alpha$ of the control lever 1. The region A represents the deflections that occur during normal operation of the control lever 1, i.e., between the neutral position $\alpha_0$ and the stop point $\alpha_1$. Beginning with the neutral position $\alpha_0$, the actuation force F required to move the control lever 1 increases from a value $F_0$, initially uniformly, until the stop point $\alpha_1$ is reached at the actuation force $F_1$.

When the control lever 1 is moved beyond the stop point $\alpha_1$ into the area B, the actuation force F necessary to deflect the control lever 1 increases much more rapidly than in the area A. Preferably, in the range of the deflection between the stop point $\alpha_1$ and the deflection position $\alpha_2$, the normal functions of the control lever 1 are available. When a defined safety-critical deflection between the positions $\alpha_2$ and $\alpha_3$ is reached, the safety function defined above is initiated. The actuation forces $F_2$, $F_3$ and $F_S$ thereby correspond to the deflections $\alpha_2$, $\alpha_3$ and $\alpha_S$, respectively.

When the control lever 1 is adapted for a specific application, the safety-critical deflection $\alpha_S$ may be designed, for example, so that the possibility of an unnecessary actuation of the safety function is reduced, and with regard to the actuation force, there is a sufficient distance between the actuation force $F_S$ required for the safety-critical deflection $\alpha_S$ and the maximum load-absorption capacity of the control lever 1.

It will be readily appreciated by those skilled in the art that modifications may be made to the invention without departing from the concepts disclosed in the foregoing description. Such modifications are to be considered as included within the scope of the following claims unless the claims, by their language, expressly state otherwise. Accordingly, the particular embodiments described in detail hereinabove are illustrative only and are not limiting to the scope of the invention, which is to be given the full breadth of the appended claims and any and all equivalents thereof.

I claim:

1. A control lever assembly, comprising:

a housing;

a movable control lever carried on the housing;

an elastic stop connected to the control lever and configured to limit movement of the control lever by contact between the elastic stop and the housing; and means for generating a restoration force for the control lever, wherein in a neutral position of the control lever the elastic stop does not contact the housing, wherein the control lever is movable between the neutral position and a stop point defined when the elastic stop contacts the housing, wherein the control lever is movable beyond the stop point by compression of the elastic stop between the control lever and the housing and wherein the elastic stop contributes to the restoration force only for deflections past the stop point.

2. The control lever assembly as claimed in claim 1, wherein the elastic component of the stop is configured such that for a deflection of the control lever beyond the stop point, the restoration force, as a function of the deflection of the control lever, increases to a greater extent than for a deflection of the control lever between a neutral position and the stop point.

3. The control lever assembly as claimed in claim 1, wherein the restoration force generating means includes a metal spring for generating the restoration force when the control lever is deflected between a neutral position and the stop point.

4. The control lever assembly as claimed in claim 1, wherein the stop includes an elastomeric component.

5. The control lever assembly as claimed in claim 1, including an electrical sensor configured to detect the deflection of the control lever.

6. The control lever assembly as claimed in claim 1, having a safety-critical deflection of the control lever defined beyond the stop point, wherein when the control lever is deflected to the safety-critical deflection, a signal is generated by an electrical sensor to activate a safety function.

7. The control lever assembly as claimed in claim 6, wherein a single electrical sensor detects the deflection of the control lever between a neutral position and the stop point and detects the safety-critical deflection.

8. The control lever assembly as claimed in claim 6, wherein the safety-critical deflection is configured such that an actuation force required to deflect the control lever to the safety-critical deflection is at least twice as great as an actuation force required to deflect the control lever to the stop point.

9. The control lever assembly as claimed in claim 6, wherein the safety-critical deflection is configured such that an actuation force required to deflect the control lever to the safety-critical deflection does not damage the control lever as a result of an overload.

10. The control lever assembly as claimed in claim 1, including a device to detect a neutral position of the control lever.

11. The control lever assembly as claimed in claim 2, wherein the restoration force generating means includes a metal spring for generating the restoration force when the control lever is deflected between the neutral position and the stop point.

12. The control lever assembly as claimed in claim 2, wherein the stop includes an elastomeric component.

13. The control lever assembly as claimed in claim 3, wherein the stop includes an elastomeric component.

14. The control lever assembly as claimed in claim 2, including an electrical sensor configured to detect the deflection of the control lever.

15. The control lever assembly as claimed in claim 3, including an electrical sensor configured to detect the deflection of the control lever.

16. The control lever assembly as claimed in claim 4, including an electrical sensor configured to detect the deflection of the control lever.

17. The control lever assembly as claimed in claim 2, having a safety-critical deflection of the control lever defined beyond the stop point, wherein when the control lever is deflected to the safety-critical deflection, a signal is generated by an electrical sensor to activate a safety function.

18. The control lever assembly as claimed in claim 3, having a safety-critical deflection of the control lever defined beyond the stop point, wherein when the control lever is deflected to the safety-critical deflection, a signal is generated by an electrical sensor to activate a safety function.

19. The control lever assembly as claimed in claim 2, wherein a single electrical sensor detects the deflection of the control lever between the neutral position and the stop point and detects the safety-critical deflection.

20. The control device as claimed in claim 7, wherein the safety-critical deflection is configured such that an actuation force required to deflect the control lever to the safety-critical deflection is at least three times greater than an actuation force required to deflect the control lever to the stop point.

* * * * *